United States Patent
Okuma

(10) Patent No.: US 11,841,286 B2
(45) Date of Patent: Dec. 12, 2023

(54) TORQUE DETECTION DEVICE, TORQUE DETECTION METHOD, ROBOT, METHOD OF MANUFACTURING PRODUCT, CONTROL DEVICE, RECORDING MEDIUM, AND STRUCTURE

(71) Applicant: CANON KABUSHIKI KAISHA, Tokyo (JP)

(72) Inventor: Isamu Okuma, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 184 days.

(21) Appl. No.: 17/136,144

(22) Filed: Dec. 29, 2020

(65) Prior Publication Data
US 2021/0208014 A1 Jul. 8, 2021

(30) Foreign Application Priority Data

Jan. 7, 2020 (JP) .................................. 2020-001012

(51) Int. Cl.
*G01L 3/12* (2006.01)
*B23P 19/04* (2006.01)
*B25J 13/08* (2006.01)

(52) U.S. Cl.
CPC ................ *G01L 3/12* (2013.01); *B23P 19/04* (2013.01); *B25J 13/085* (2013.01)

(58) Field of Classification Search
CPC ............ G01L 3/12; B23P 19/04; B25J 13/085
See application file for complete search history.

(56) References Cited

U.S. PATENT DOCUMENTS

| 8,291,775 B2* | 10/2012 | Nagasaka ............. G01L 3/1457 73/862.041 |
| 8,760,030 B2* | 6/2014 | Ross ..................... H02K 41/06 310/156.16 |
| 9,021,919 B2 | 5/2015 | Takahashi et al. ... F16H 49/001 |
| 2013/0247716 A1 | 9/2013 | Takahashi et al. ... F16H 49/001 |
| 2016/0131216 A1 | 5/2016 | Miyazaki |
| 2017/0241761 A1 | 8/2017 | Kosaka et al. |

(Continued)

FOREIGN PATENT DOCUMENTS

| CN | 106737773 A | * 5/2017 | |
| CN | 107962591 A | * 4/2018 | .......... B25J 19/0095 |

(Continued)

OTHER PUBLICATIONS

Office Action dated Oct. 3, 2023 in counterpart Japanese Application No. 2020-001012, together with English translation thereof.

*Primary Examiner* — Octavia Davis Hollington
(74) *Attorney, Agent, or Firm* — Venable LLP

(57) ABSTRACT

A torque detection device includes a first portion, a second portion disposed inside the first portion, and a connecting portion configured to link the first portion and the second portion. The first portion includes a first convex portion that projects toward the second portion. The second portion includes a second convex portion that projects toward the first portion. An inner surface of the first portion and a surface of the first convex portion link to the connecting portion. An outer surface of the second portion and a surface of the second convex portion link to the connecting portion. When torque is applied, the connecting portion deforms, and the first portion and the second portion are displaced relative to each other.

21 Claims, 11 Drawing Sheets

(56) References Cited

U.S. PATENT DOCUMENTS

| | | |
|---|---|---|
| 2019/0064018 A1 | 2/2019 | Miyazawa |
| 2019/0250051 A1 | 8/2019 | Suzuki et al. |
| 2019/0264751 A1 | 8/2019 | Oosawa ................... F16D 3/74 |
| 2019/0275681 A1 | 9/2019 | Böhme ................. B25J 13/085 |
| 2019/0316990 A1* | 10/2019 | Kawahara ............... G01L 5/169 |
| 2020/0173869 A1 | 6/2020 | Negishi |

FOREIGN PATENT DOCUMENTS

| | | | | |
|---|---|---|---|---|
| CN | 207556719 U | * | 6/2018 | ........... B25J 13/085 |
| CN | 109813475 A | * | 5/2019 | |
| CN | 209979107 U | * | 1/2020 | |
| CN | 214690018 U | * | 11/2021 | |
| CN | 217582966 U | * | 10/2022 | |
| DE | 102013206556 A1 | * | 10/2014 | .............. G01L 1/04 |
| JP | H6-190770 A | | 7/1994 | |
| JP | 2016-94967 A | | 5/2016 | |
| JP | 2017-151072 | | 8/2017 | |
| JP | 2017-203645 A | | 11/2017 | |
| JP | 2018-91813 A | | 6/2018 | |
| JP | 2018-132498 | | 8/2018 | |
| JP | 6439897 B2 | * | 12/2018 | .............. B62D 5/04 |
| JP | 2019-45216 A | | 3/2019 | |
| JP | 2019056680 A | * | 4/2019 | ............. G01L 3/104 |

\* cited by examiner

TORQUE DETECTION DEVICE, TORQUE DETECTION METHOD, ROBOT, METHOD OF MANUFACTURING PRODUCT, CONTROL DEVICE, RECORDING MEDIUM, AND STRUCTURE

BACKGROUND OF THE INVENTION

Field of the Invention

The present invention relates to torque detection.

Description of the Related Art

In recent years, demand for robots having an articulated arm that enables general-purpose operations is increasing as the machining and assembly work for industrial products is increasingly automated in production sites such as factories. The robots are required to move more flexibly than ever before, for performing various types of work including complex work such as assembling a precision machine, collaborative work in which the robot collaborates with a worker, and assistance work in which the robot assists humans in medical and care services. For achieving such a flexible motion, a force control function is essential for adapting the robot to the external force. Thus, it is required to accurately detect the torque applied to a joint of the robot arm.

For detecting the torque applied to the joint of the robot arm, a torque sensor may be mounted in the joint of the robot arm. In particular, in a case where the robot arm performs the complex work (e.g. assembly work) as described above, the torque sensor is required to have high accuracy and high rigidity. In addition to this, the torque sensor to be mounted in the robot arm is required to be thin, because the space in which the torque sensor is to be mounted is limited in size.

Japanese Patent Application Publication No. 2018-91813 discloses a strain gauge including a Cr—N thin-film resistive member (strain sensing film) and used as a detecting element of the torque sensor. The torque sensor has a configuration in which an inner annular member and an outer annular member are linked with each other via plate-like strain causing members; and detects force (torque) applied in the circumferential direction of the annular members, by detecting displacement of each strain causing member by using the strain gauge.

However, the torque sensor whose structure is disclosed in Japanese Patent Application Publication No. 2018-91813 has less rigidity in a direction other than the torque detection direction, that is, in a non-detection direction. Thus, if force is applied in the non-detection direction, the strain causing members, or a connecting portion between a strain causing member and an annular member may be damaged.

For ensuring the mechanical strength against the force applied in the non-detection direction, a guide mechanism such as a bearing could be additionally disposed in an annular portion. However, if the guide mechanism were disposed, the sliding resistance of the guide mechanism would be detected by the torque sensor, probably deteriorating the detection accuracy for effective torque.

Thus, it is desired to achieve a torque sensor having high detection accuracy and ensuring sufficient mechanical strength against the force applied in the non-detection direction.

SUMMARY OF THE INVENTION

According to a first aspect of the present disclosure, a torque detection device includes a first portion, a second portion disposed inside the first portion, and a connecting portion configured to link the first portion and the second portion. The first portion includes a first convex portion that projects toward the second portion. The second portion includes a second convex portion that projects toward the first portion. An inner surface of the first portion and a surface of the first convex portion link to the connecting portion. An outer surface of the second portion and a surface of the second convex portion link to the connecting portion. When torque is applied, the connecting portion deforms, and the first portion and the second portion are displaced relative to each other.

According to a second aspect of the present disclosure, a torque detection method in a torque detection device includes detecting a torque, depending on a relative displacement between a first portion and a second portion. The torque detection device includes the first portion, the second portion disposed inside the first portion, a connecting portion configured to link the first portion and the second portion. The first portion includes a first convex portion that projects toward the second portion. The second portion includes a second convex portion that projects toward the first portion. An inner surface of the first portion and a surface of the first convex portion link to the connecting portion. An outer surface of the second portion and a surface of the second convex portion link to the connecting portion. When torque is applied, the connecting portion deforms, and the first portion and the second portion are displaced relative to each other.

Further features of the present invention will become apparent from the following description of exemplary embodiments with reference to the attached drawings.

DESCRIPTION OF THE EMBODIMENTS

Figure 1A:
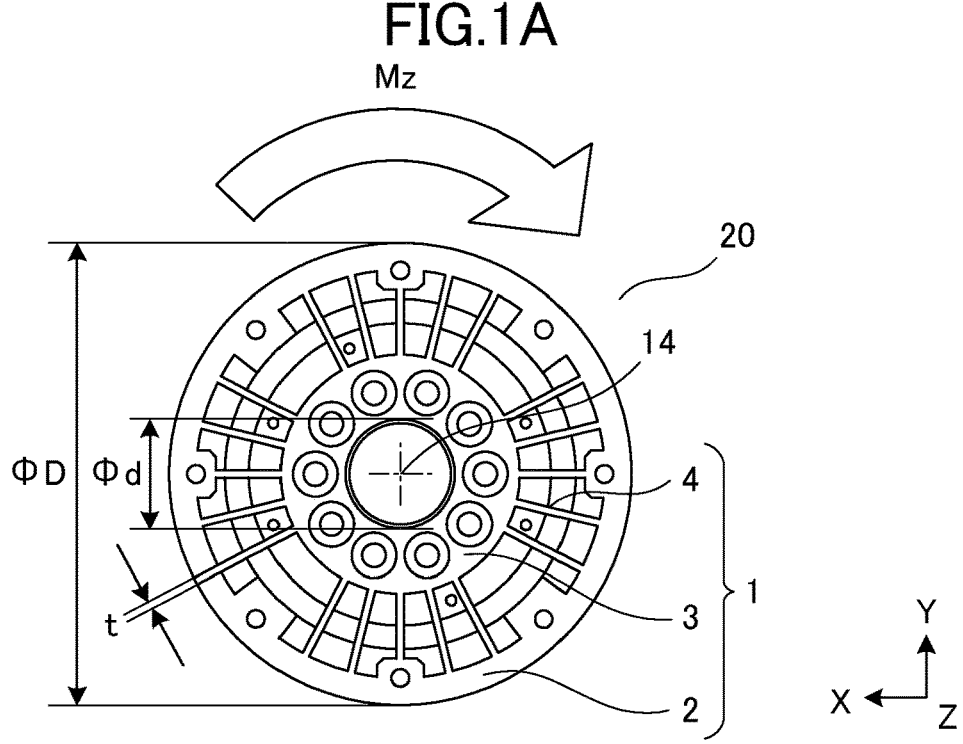
FIG. 1A is a bottom view of a torque sensor unit of an embodiment.

Next, with reference to the accompanying drawings, a torque detection device of an embodiment of the present invention, a control device that controls an apparatus by using the torque detection device, a robot including the torque detection device, and the like will be described.

Hereinafter, in the drawings that will be referred to in the description of the following embodiments, a component having an identical reference symbol is given an identical function, unless specified otherwise.

First Embodiment

Structure of Torque Sensor Unit

With reference to some figures, a torque sensor unit of a first embodiment will be described.

Figure 1B:
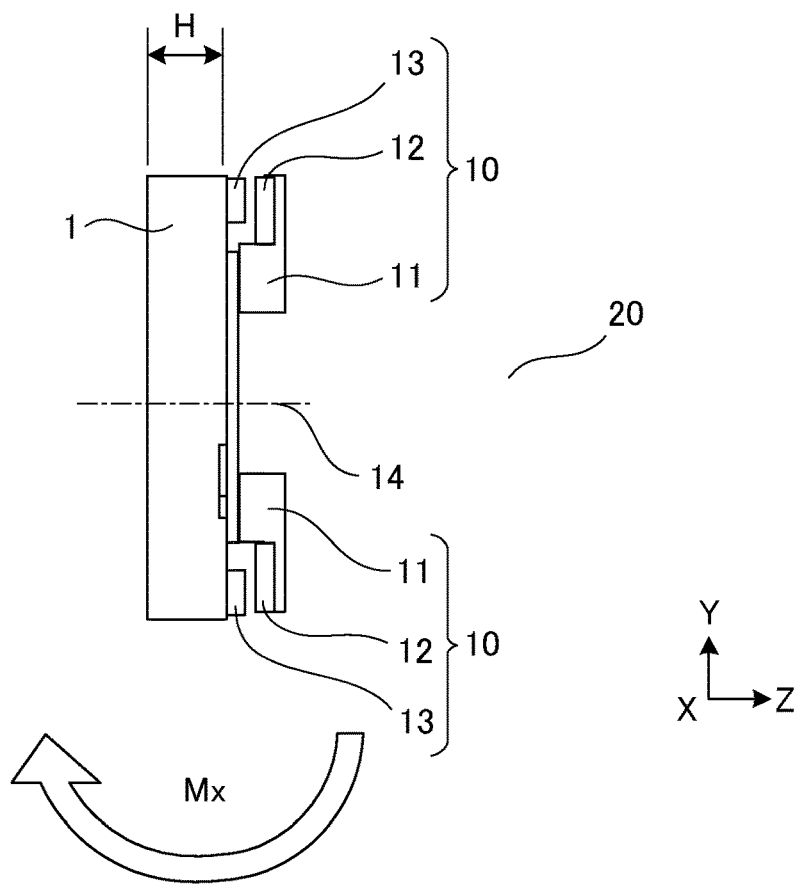
FIG. 1B is a side view of the torque sensor unit of the embodiment.
Figure 2:
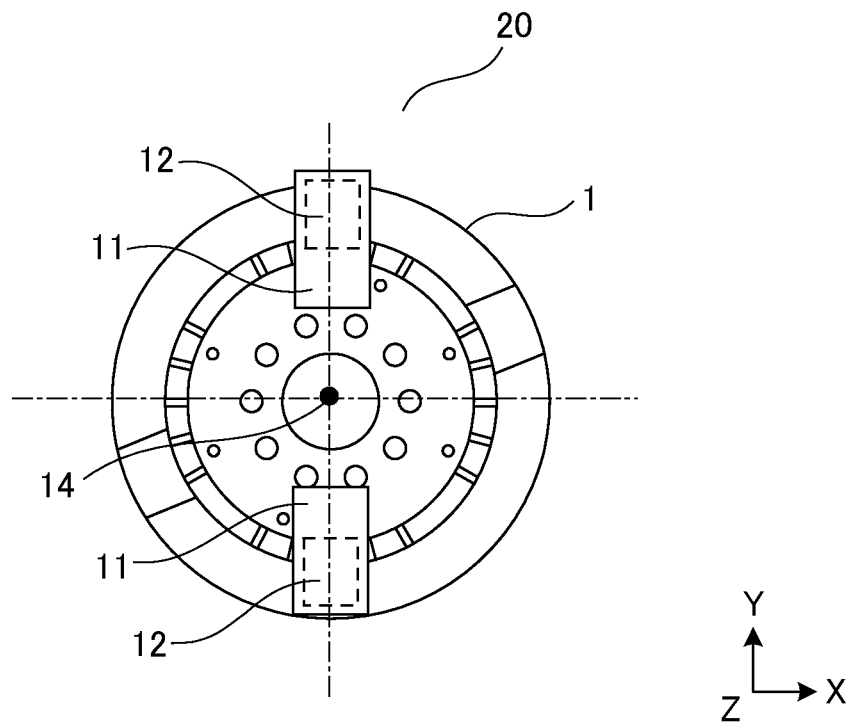
FIG. 2 is a top view of the torque sensor unit of the embodiment.

FIG. 1A is a bottom view of a torque sensor unit 20, FIG. 1B is a side view of the torque sensor unit 20, and FIG. 2 is a top view of the torque sensor unit 20. The torque sensor unit 20 includes a structure 1, and an optical encoder 10 that detects deformation of the structure 1.

Figure 3:
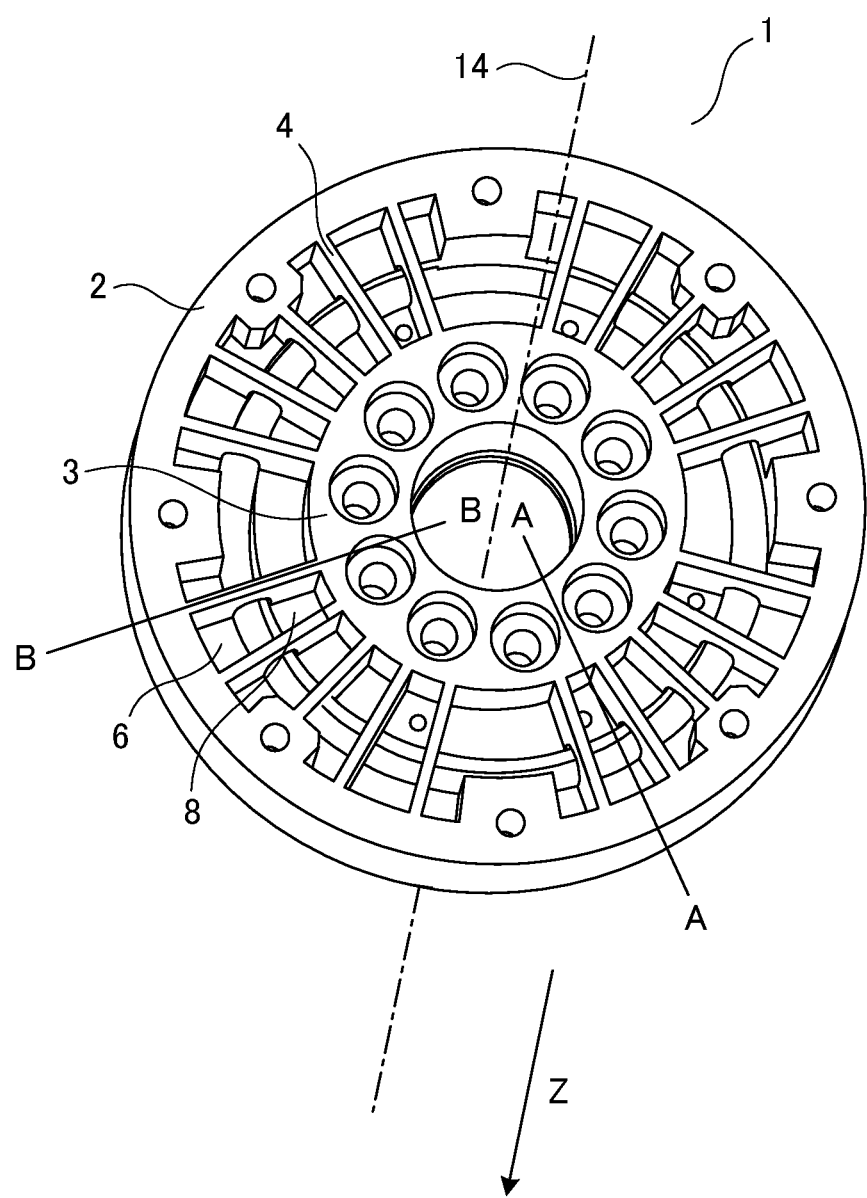
FIG. 3 is an external view of a structure of the torque sensor unit of the embodiment.

FIG. 3 is a perspective view illustrating an external appearance of the structure 1.

The structure 1 includes an outer ring portion 2 that serves as a first portion, an inner ring portion 3 that serves as a second portion, and connecting portions 4 that link the outer ring portion 2 and the inner ring portion 3. The outer ring portion 2 and the inner ring portion 3 have basic shapes of doughnut (ring) with different diameters, and are coaxially formed around a rotation axis 14.

The outer ring portion 2 and the inner ring portion 3 can be fastened to objects whose torque is to be measured. For example, as described later with reference to FIG. 6, when the torque sensor unit 20 is attached to a rotary joint that is an object to be measured, the outer ring portion 2 is fastened to one of a link 125 and a reduction-gear fixing portion 31b, and the inner ring portion 3 is fastened to the other.

The link 125 and the reduction-gear fixing portion 31b are displaced relative to each other. As illustrated in FIG. 1A, each of the outer ring portion 2 and the inner ring portion 3 has a plurality of fixing portions (e.g. screw holes or tap holes) formed along a circumference and used to fasten the outer ring portion 2 or the inner ring portion 3 to a corresponding object to be measured.

The connecting portions 4, which link the outer ring portion 2 and the inner ring portion 3, extend radially, when viewed from the rotation axis 14, in a space in which an inner surface of the outer ring portion 2 and an outer surface of the inner ring portion 3 face each other. In other words, the plurality of connecting portions 4 are disposed radially along radial directions of the outer ring portion 2.

If a torque to be detected, or a torque Mz applied around the rotation axis 14, is applied between the outer ring portion 2 and the inner ring portion 3, each of the connecting portions 4 elastically deforms in a direction orthogonal to a radial direction of the outer ring portion 2. Preferably, the connecting portions 4, which are strain causing members, are plate springs made of elastic material.

The structure 1 is preferably made as a one-body structure by cutting a base material in a cutting process or the like. However, the structure 1 may be made by using any one of various 3D printers in three-dimensional modeling, or may be made by preparing the outer ring portion 2, the inner ring portion 3, and the connecting portions 4 as separate members, and by joining them into a one-body structure. The connecting portions 4 of the structure 1 are made of a predetermined material, such as resin or metal (e.g. steel or stainless steel), having an elastic (spring) coefficient corresponding to a target torque detection range and a resolution necessary for the target torque detection range.

Figure 4A:
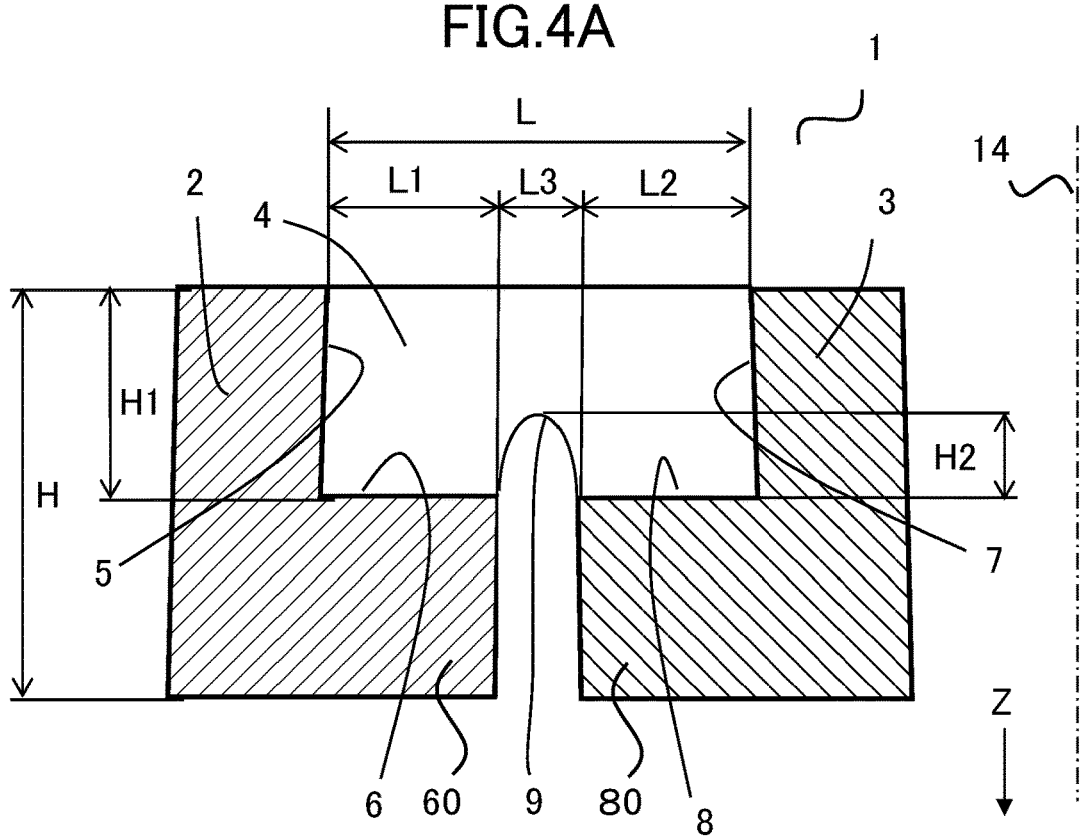
FIG. 4A is a cross-sectional view of a structure of a first embodiment, taken along a line A-A of FIG. 3.
Figure 4B:
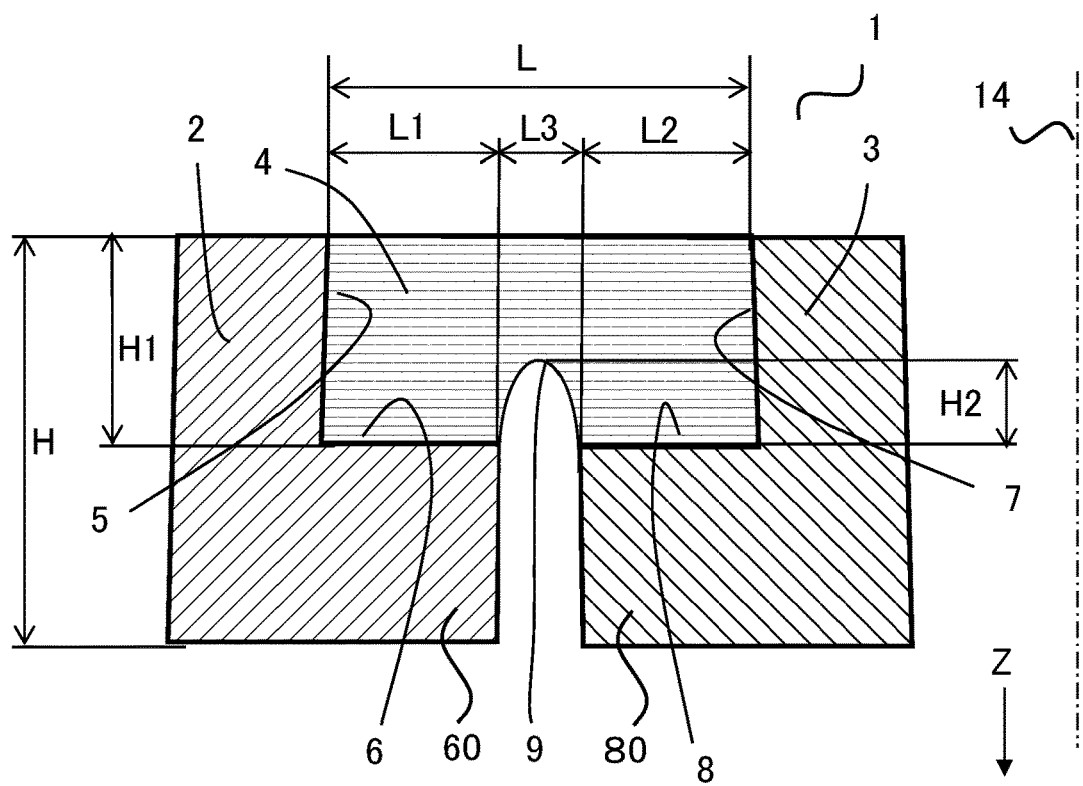
FIG. 4B is a cross-sectional view of the structure of the first embodiment, taken along a line B-B of FIG. 3.

FIG. 4A is a cross-sectional view of the structure 1, taken along a line A-A of FIG. 3. The line A-A indicates a direction of a radius of the outer ring portion 2, and on the radius, any connecting portion 4 is not formed. FIG. 4B is a cross-sectional view of the structure 1, taken along a line B-B of FIG. 3.

The line B-B indicates a direction of a radius of the outer ring portion 2, and on the radius, a connecting portion 4 is formed.

As illustrated in FIG. 4A, the cross section of each of the outer ring portion 2 and the inner ring portion 3 is almost L-shaped. The outer ring portion 2 includes a cylindrical portion (first cylindrical portion) having a predetermined thickness, and a flange portion (first convex portion) 60. The flange portion 60 projects from an inner surface 5 of the cylindrical portion toward the rotation axis 14, by L1. The inner ring portion 3 includes a cylindrical portion (second cylindrical portion) having a predetermined thickness, and a flange portion (second convex portion) 80. The flange portion 80 projects from an outer surface 7 of the cylindrical portion toward a direction opposite to the rotation axis 14, by L2. The inner surface 5 of the cylindrical portion of the outer ring portion 2 and the outer surface 7 of the cylindrical portion of the inner ring portion 3 are separated from each other by a distance of L. In addition, a side surface of the flange portion 60 and a side surface of the flange portion 80 face each other via a clearance having a distance of L3. The flange portions 60 and 80 may be convex portions projecting from the corresponding cylindrical portions in a direction orthogonal to the rotation axis 14, or may be flange portions additionally formed on the corresponding ring portions. In other words, the flange portion 60 may be a convex portion projecting from the cylindrical portion toward the center of the outer ring portion 2, and the flange portion 80 may be a convex portion projecting from the cylindrical portion toward a direction opposite to the center of the inner ring portion 3.

As illustrated in FIG. 4B, the connecting portions 4 link to the outer ring portion 2 such that the connecting portions 4 link to the inner surface 5 of the cylindrical portion and the top surface 6 of the flange portion 60. In addition, the connecting portions 4 link to the inner ring portion 3 such that the connecting portions link to the outer surface 7 of the cylindrical portion and the top surface 8 of the flange portion 80. The connecting portions 4 are each formed like a bridge so as to cross over the clearance having a distance of L3 and separating the flange portions 60 and 80 from each other, and link the outer ring portion 2 and the inner ring portion 3. In addition, each of the connecting portions 4 has a cutout portion 9 formed at a position corresponding to the clearance between the flange portions 60 and 80.

Note that in FIG. 4B, for facilitating understanding of the structure, the cross sections of the outer ring portion 2, the inner ring portion 3, and the connecting portions 4 have different textures, and a boundary between adjacent cross sections is clearly illustrated. However, in a case where the structure 1 is formed as one-body structure by cutting a base material or by using a 3D printer in three-dimensional modeling, the boundary of actual adjacent cross sections may not be able to be visually recognized.

Next, the optical encoder 10 will be described with reference to FIGS. 1B and 2. The optical encoder 10 detects deformation of the structure 1 produced when the torque Mz around the rotation axis 14 is applied between the outer ring portion 2 and the inner ring portion 3. When the torque Mz around the rotation axis 14 is applied between the outer ring portion 2 and the inner ring portion 3, each of the connecting portions 4 elastically deforms in a direction orthogonal to a radial direction of the outer ring portion 2. As a result, the outer ring portion 2 and the inner ring portion 3 are rotated and displaced relative to each other. The optical encoder 10 quantitatively detects the rotation and displacement.

The optical encoder 10 functions as an optical position sensor (encoder), and includes a scale 13 and a detecting head 12. The scale 13 has a scale pattern formed on a surface of the scale 13, and the detecting head 12 reads the scale pattern and detects positional information. The detecting head 12 is an optical detecting portion that detects a relative rotation and displacement between the outer ring portion 2 and the inner ring portion 3.

The scale 13 is fixed to the outer ring portion 2 of the structure 1, and the detecting head 12 is fixed to the inner ring portion 3 of the structure 1 via a detecting-head attachment portion 11.

The detecting head 12 is an optical sensor that includes a light emitting element and a light receiving element, and that causes the light emitting element to emit light to the scale pattern of the scale 13 and causes the light receiving element to detect light reflected from the scale pattern. As illustrated in FIG. 1B, the detecting head 12 is disposed so as to face the scale 13.

The scale pattern formed on the scale 13 is a regular or modulated pattern, in which the shade of color or the reflectivity on the surface is changed so that the pattern can be optically read by the detecting head 12. Note that the scale pattern may not be formed in one line. For example, if required by a computation method for the detection, the scale pattern may be a shade pattern formed in a plurality of lines. In this case, phase in arrangement of one line may be different from phase in arrangement of another line. The pitch of the scale pattern is determined, for example, in accordance with the resolution required for the position detection. Since the encoder has recently been improved in precision and resolution, a pitch on the order of micrometers can be used for the scale pattern.

Next, torque detection by the torque sensor unit 20 will be described. When the torque Mz is applied around the rotation axis 14, and each of the connecting portions 4 of the structure 1 elastically deforms in a direction orthogonal to a radial direction of the outer ring portion 2, the outer ring portion 2 and the inner ring portion 3 are rotated and displaced relative to each other. Since the position of the detecting head 12 relative to the scale 13 changes, a spot on the scale 13 irradiated with the light moves on the scale 13. When the spot on the scale 13 irradiated with the light moves on the pattern of the scale 13, the amount of light received by the light receiving element changes. In accordance with the change in the amount of light, the optical encoder 10 detects the amount of relative movement between the scale 13 and the detecting head 12, that is, the amount of relative movement between the outer ring portion 2 and the inner ring portion 3.

The amount of movement detected is converted by a torque-detection control portion, into a value of torque applied between the outer ring portion 2 and the inner ring portion 3 of the structure 1. The torque-detection control portion converts the amount of movement into a torque detection value by using a conversion coefficient, which is used for converting an output value (i.e. the amount of movement) from the optical encoder 10, into a torque value. The torque-detection control portion may be achieved by a torque detection program executed by a CPU 201, or by a hardware component such as a PLC.

In the above-described manner, the torque sensor unit 20 detects the torque Mz applied around the rotation axis 14, in a device (for example, a joint of a robot) in which the torque sensor unit 20 is disposed.

In the present embodiment, the outer ring portion 2 and the inner ring portion 3 are not formed like a cylinder having a constant thickness, unlike the conventional art. Instead, each of the outer ring portion 2 and the inner ring portion 3 has a flange portion that projects in a direction orthogonal to the rotation axis 14, and is almost L-shaped in cross section. Specifically, the outer ring portion 2 includes the cylindrical portion having a predetermined thickness, and the flange portion 60 that projects from the inner surface 5 of the cylindrical portion toward the rotation axis 14, by L1. In addition, the inner ring portion 3 includes the cylindrical portion having a predetermined thickness, and the flange portion 80 that projects from the outer surface 7 of the cylindrical portion toward a direction opposite to the rotation axis 14, by L2.

In the conventional torque sensor in which the outer ring portion and the inner ring portion are cylinders having a constant thickness, if force (e.g. force Mx illustrated in FIG. 1B and applied around an X axis) other than the torque applied around the rotation axis is applied, the torque sensor easily deforms, or is damaged. For this reason, a guide mechanism such as a bearing is needed in the conventional torque sensor.

In contrast to this, in the present embodiment, since the outer ring portion 2 and the inner ring portion 3 have the flange portions, the torque sensor of the present embodiment has high mechanical rigidity against the force applied in a direction other than the direction in which the torque Mz is applied around the rotation axis 14. Thus, the deformation and damage hardly occur in the torque sensor of the present embodiment.

In addition, in the conventional torque sensor, the strain causing members link to the cylindrical outer ring portion having a constant thickness such that the strain causing members link to only the inner surface of the outer ring portion, and link to the cylindrical inner ring portion having a constant thickness such that the strain causing members link to only the outer surface of the inner ring portion.

That is, the strain causing members link to the outer ring portion and the inner ring portion only along a line parallel with the rotation axis. In this case, since the link strength between the strain causing members and the outer ring portion and the link strength between the strain causing members and the inner ring portion are not high, the upper limit of allowable torque (measured torque) around the rotation axis cannot be increased. In addition, if force (e.g. force Mx illustrated in FIG. 1B and applied around the X axis) other than the torque applied around the rotation axis is applied, the damage will easily occur in a boundary between the strain causing members and the outer ring portion, and a boundary between the strain causing members and the inner ring portion.

In the present embodiment, however, the plate-like connecting portions 4 serving as the strain causing members link to the outer ring portion 2 such that the connecting portions 4 link to the inner surface 5 of the cylindrical portion and the top surface 6 of the flange portion 60, and link to the inner ring portion 3 such that the connecting portions 4 link to the outer surface 7 of the cylindrical portion and the top surface 8 of the flange portion 80. That is, the connecting portions 4 of the present embodiment link to the outer ring portion 2 such that the connecting portions 4 link to not only the side surface of the cylindrical portion but also the top surface of the flange portion, and link to the inner ring portion 3 such that the connecting portions 4 link to not only the side surface of the cylindrical portion but also the top surface of the flange portion. In other words, the connecting portions 4 link to the outer ring portion 2 and the inner ring portion 3, not only along a line (side) parallel with the rotation axis, but also along a line (side) orthogonal to the rotation axis. Thus, the torque sensor of the present embodiment has high link strength against the torque Mz applied around the rotation axis 14 and the force applied in a direction other than the direction in which the torque Mz is applied. Thus, the deformation and damage hardly occur in a boundary between the connecting portions 4 and the outer ring portion 2, and a boundary between the connecting portions 4 and the inner ring portion 3.

In addition, in the present embodiment, the connecting portions 4 are each formed like a bridge so as to cross over the clearance having a distance of L3 and separating the flange portions 60 and 80 from each other, and link the outer ring portion 2 and the inner ring portion 3. Each of the connecting portions 4 has the cutout portion 9 formed at a position corresponding to the clearance between the flange portions 60 and 80. If the force (e.g. force Mx illustrated in FIG. 1B and applied around the X axis) other than the torque applied around the rotation axis is applied, the stress may concentrate locally on a portion of each connecting portion 4 that crosses over the clearance. However, the cutout portion 9 can prevent the stress from concentrating on the portion, and thereby can prevent damage of the connecting portions 4. The size and shape of the cutout portion 9 may be determined as appropriate in consideration of the balance between the rigidity in the detection direction and the rigidity in the non-detection direction.

The present embodiment can provide a torque sensor that has high detection accuracy and keeps sufficient rigidity in the non-detection direction, even when a thickness H of the structure 1 is decreased.

Specific Example of Torque Sensor Unit

Next, a preferable specific example in the present embodiment will be described. In the structure 1 of the torque sensor unit 20, an outer diameter D was set at 68 mm, the thickness H in the rotation-axis direction was set at 12 mm, and an inner diameter d was set at 16 mm. In each of the connecting portions 4, a thickness t was set at 1.2 mm, a length L was set at 12.5 mm, and a width H1 was set at 8 mm. In addition, a length of the flange portion 60 by which the flange portion 60 of the outer ring portion 2 projects from the cylindrical portion, that is, the length L1 of the flange portion 60 in a direction orthogonal to the rotation axis 14 was set at 4.3 mm. A length of the flange portion 80 by which the flange portion 80 of the inner ring portion 3 projects from the cylindrical portion, that is, the length L2 of the flange portion 80 in the direction orthogonal to the rotation axis 14 was set at 4.7 mm. In the cutout portion 9 formed in each connecting portion 4, a length H2 in the rotation-axis direction was set at 4.25 mm, and a length in the direction orthogonal to the rotation axis was set at 3.5 mm. Note that the length of the cutout portion 9 in the direction orthogonal to the rotation axis is equal to the distance L3 by which the flange portions 60 and 80 are separated from each other. The structure 1 was formed by cutting a base material made of SUS630.

In this example, a measurement result on the rigidity in the detection direction was 25,000 Nm/rad, and a measurement result on the rigidity in the non-detection direction was 125,000 Nm/rad.

The rigidity in the non-detection direction was five times the rigidity in the detection direction.

In a conventional torque sensor having no flange portions, when the torque sensor has the same outer diameter D, inner diameter d, and thickness H in the rotation-axis direction, as those of the above-described example, the rigidity in the detection direction was 25,000 Nm/rad, and the rigidity in the non-detection direction was 88,000 Nm/rad. As a result, it was confirmed that the rigidity in the non-detection direction is improved by 42% in the torque sensor of this example, compared to the conventional torque sensor.

Robot

Next, a robot including the above-described torque sensor unit will be described.

Figure 5:
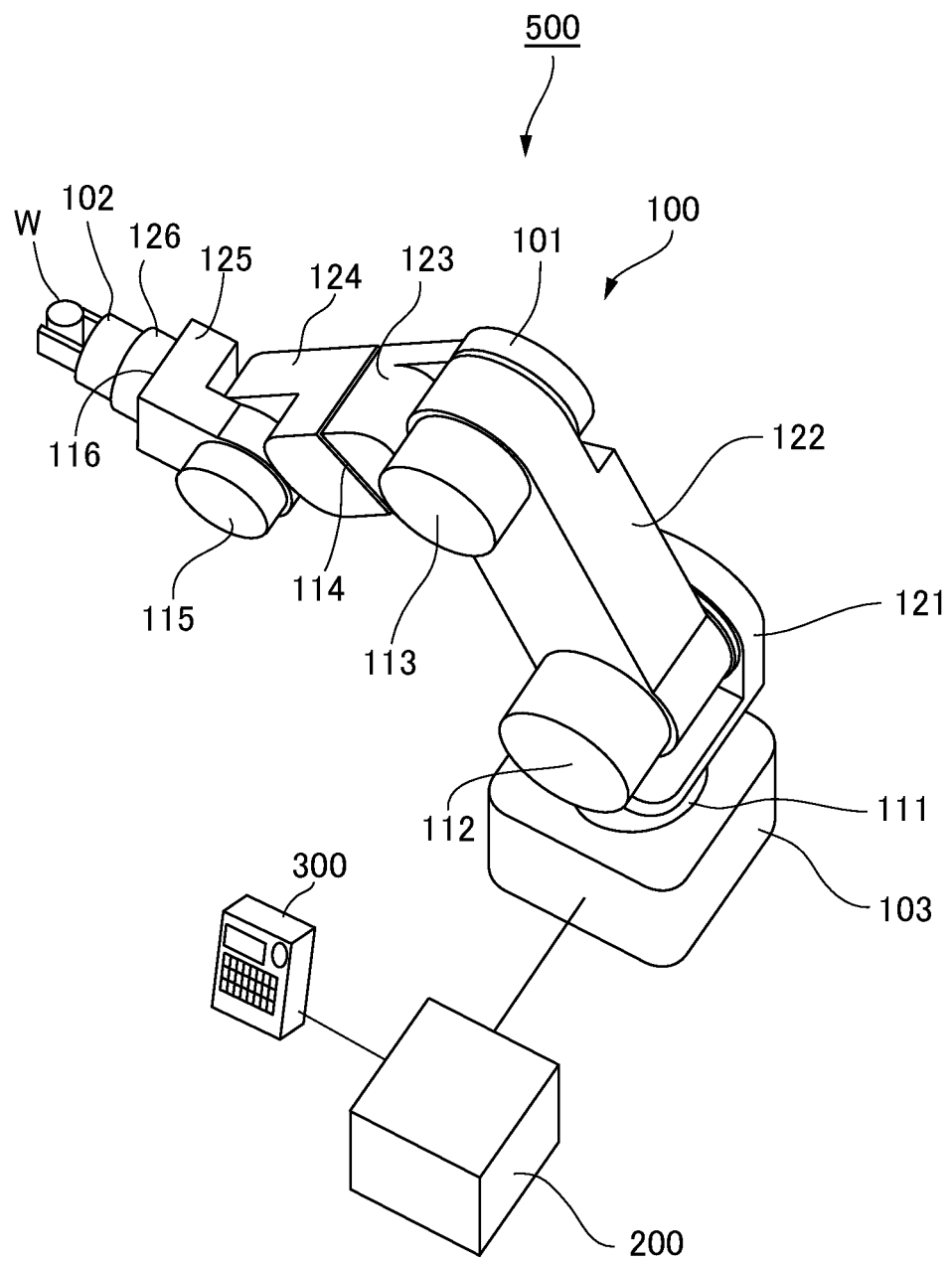
FIG. 5 is a perspective view illustrating an external appearance of a robot in which the torque sensor unit of the embodiment is mounted.

FIG. 5 is a perspective view schematically illustrating an external appearance of a robot 500 in which the torque sensor unit of the first embodiment is mounted. As illustrated in FIG. 5, the robot 500 includes an articulated robot arm 100 that assembles a workpiece W into a product, a control device 200 that controls the articulated robot arm 100, and a teaching pendant 300 that is connected to the control device 200.

The articulated robot arm 100 includes a six-axis control robot arm 101 and a hand (end effector) 102 connected to an end of the robot arm 101.

The robot arm 101 includes a base portion 103 fixed to a workbench, a plurality of links 121 to 126 that transmit displacement and force, and a plurality of joints 111 to 116 that pivotably or rotatably link the plurality of links 121 to 126 to each other. Furthermore, each of the joints 111 to 116 includes the torque sensor unit that detects the torque applied to the joint.

Figure 6:
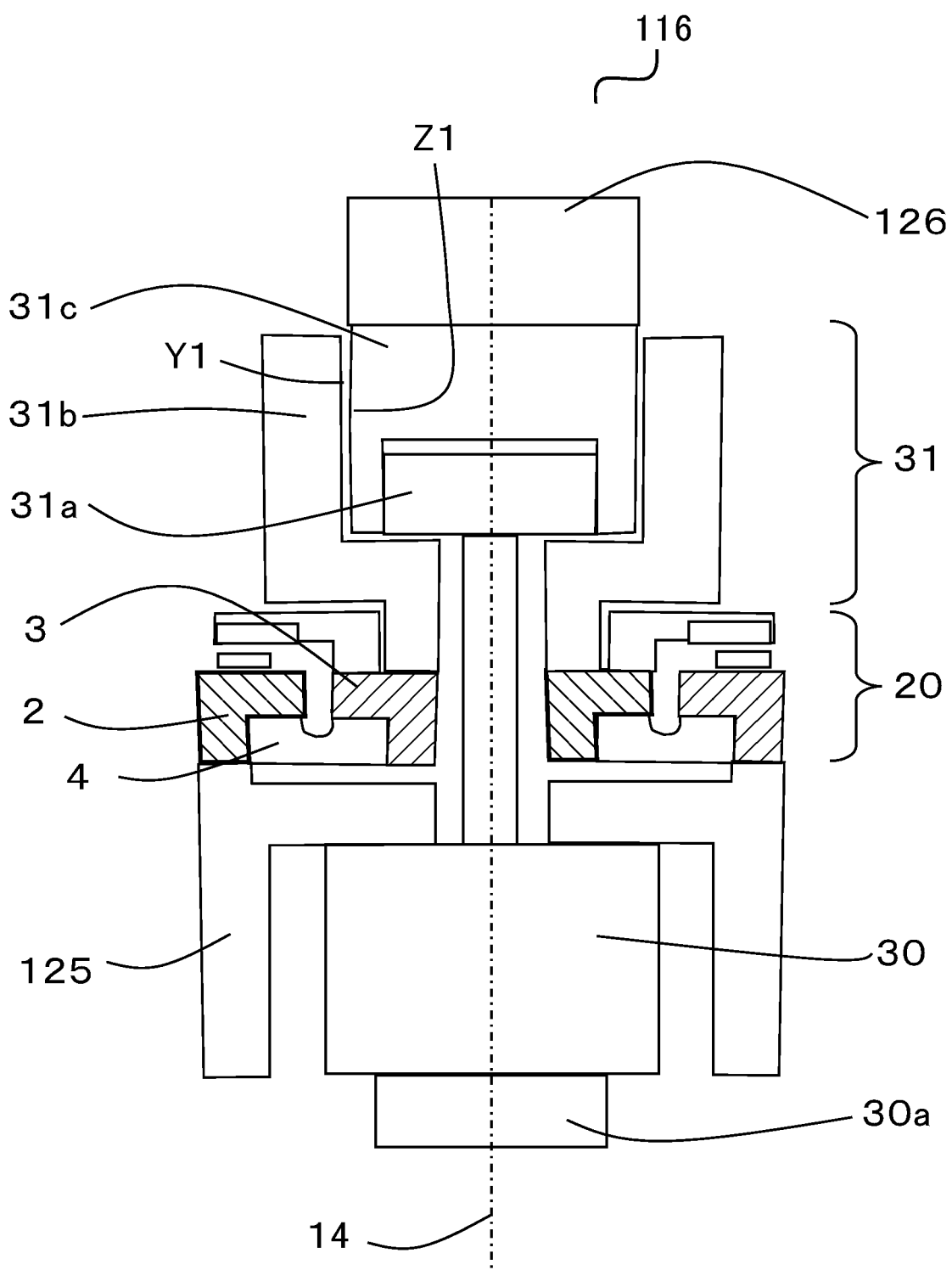
FIG. 6 is a cross-sectional view of a joint in which the torque sensor unit of the embodiment is mounted.

FIG. 6 is a cross-sectional view of the joint 116 of the robot arm 101 illustrated in FIG. 5. The joint 116 includes the links 125 and 126 that are structural members, a servo motor 30, a strain-wave-gearing reduction gear 31 that reduces output of the servo motor 30, and the torque sensor unit 20 that detects the torque of the joint. As illustrated in FIG. 6, the link 125 is linked to the link 126 via the torque sensor unit 20 and the strain-wave-gearing reduction gear 31.

The servo motor 30 is an electromagnetic motor, and may be a brushless DC motor or an AC servo motor. The servo motor 30 is fastened to the link 125 via bolts or the like, and the power from the servo motor 30 is transmitted to a reduction-gear input shaft 31a of the strain-wave-gearing reduction gear 31. An input shaft encoder 30a is mounted on a rotary shaft of the servo motor 30. The input shaft encoder 30a generates an input-side pulse signal in accordance with the rotation of the servo motor 30, and outputs the input-side pulse signal to the control device 200. Note that a brake unit may be disposed between the servo motor 30 and the input shaft encoder 30a, as necessary, for keeping a posture of the robot arm 101 while the power is off. The input shaft encoder 30a may be an optical encoder or a magnetic encoder, like a general-purpose rotary encoder.

The strain-wave-gearing reduction gear 31 includes the reduction-gear input shaft 31a that receives the power from the servo motor 30, a reduction-gear fixing portion 31b that holds the members of the reduction gear, and a reduction-gear output shaft 31*c* that outputs torque whose speed has been reduced. The reduction-gear input shaft 31*a* includes an elliptical cam and an elastic bearing. An inner circumferential portion Y1 of the ring-shaped reduction-gear fixing portion 31*b* and an outer circumferential portion Z1 of the cup-shaped reduction-gear output shaft 31*c* that is an elastic member have teeth. The number of teeth of the inner circumferential portion Y1 and the number of teeth of the outer circumferential portion Z1 are different from each other, and the teeth of the inner circumferential portion Y1 and the teeth of the outer circumferential portion Z1 mesh with each other. When the elliptical reduction-gear input shaft 31*a* is rotated by the servo motor 30, the reduction-gear output shaft 31*c* that is an elastic member elliptically deforms, and the reduction-gear output shaft 31*c* and the reduction-gear fixing portion 31*b* mesh with each other at both ends of the major axis of the elliptical shape of the reduction-gear output shaft 31*c*.

The link 125 is fastened to the outer ring portion 2 of the torque sensor unit 20 via bolts or the like, and the reduction-gear fixing portion 31*b* is fastened to the inner ring portion 3 of the torque sensor unit 20 via bolts or the like. The reduction-gear output shaft 31*c* is fastened to the link 126 via bolts or the like, and the reduction-gear fixing portion 31*b* and the reduction-gear output shaft 31*c* are linked to each other via a crossed roller bearing. Thus, when the reduction-gear input shaft 31*a* is rotated by the power from the servo motor 30, the reduction-gear output shaft 31*c* meshes with the reduction-gear fixing portion 31*b* while deforming in elliptical shape, and the link 126 rotates relative to the link 125 and the torque sensor unit 20.

As previously described, the torque sensor unit 20 causes the optical encoder to detect the amount of deformation of the structure, and converts the amount of deformation to a torque value. In addition, the torque sensor unit 20 is disposed between the link 125 and the reduction-gear fixing portion 31*b*, and detects the torque applied to the joint.

As described above, in the joint 116, the input torque from the servo motor 30 is transmitted to the reduction-gear input shaft 31*a*. The rotational speed of the servo motor 30 is reduced to 1/N of the rotational speed of the servo motor 30 by the reduction unit, and the output torque is outputted from the reduction-gear output shaft 31*c* to the link 126.

Figure 7:
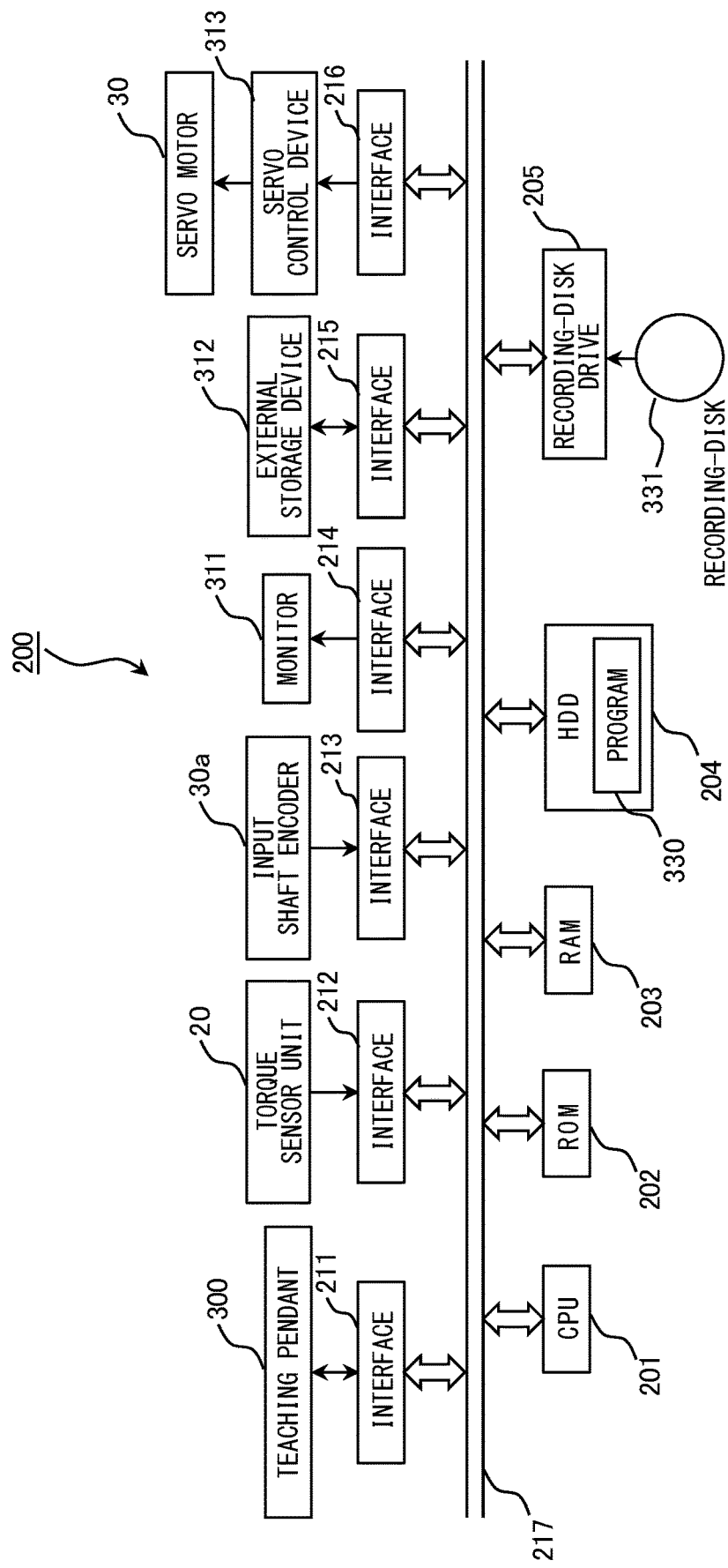
FIG. 7 illustrates a configuration of a control device of the robot in which the torque sensor unit of the embodiment is mounted.

FIG. 7 illustrates a configuration of the control device 200 of the robot 500 in which the torque sensor unit of the present embodiment is mounted. As illustrated in FIG. 7, the control device 200 that serves as a control unit includes a CPU (computing unit) 201, a ROM 202, a RAM 203, an HDD (storage unit) 204, a recording-disk drive 205, and various interfaces 211 to 216.

The CPU 201 is connected with the ROM 202, the RAM 203, the HDD 204, the recording-disk drive 205, and the various interfaces 211 to 216 via a bus 217. The ROM 202 stores a base program such as a BIOS. The RAM 203 is a storage device that temporarily stores results of a computing process performed by the CPU 201.

The HDD 204 is a storage unit that non-transitorily stores data, including various types of data that are results of a computing process performed by the CPU 201. In addition, the HDD 204 stores a program 330 that causes the CPU 201 to execute various types of computing process. The CPU 201 executes the various types of computing process, depending on the program 330 recorded (stored) in the HDD 204 that is a recording medium. The recording-disk drive 205 can read various types of data and a program stored in a recording disk 331.

The interface 211 is connected with the teaching pendant 300 that a user can operate. The teaching pendant 300 outputs target joint angles (inputted by the user) of the joints 111 to 116 to the CPU 201, via the interface 211 and the bus 217.

The interface 212 is connected with the torque sensor unit 20. The torque sensor unit 20 outputs the previously-described torque detection value to the CPU 201, via the interface 212 and the bus 217. The interface 213 is connected with the input shaft encoder 30*a*. The input shaft encoder 30*a* outputs the previously-described pulse signal to the CPU 201, via the interface 213 and the bus 217.

The interface 214 is connected with a monitor 311 that displays various images; the interface 215 is connected with an external memory 312, such as a rewritable nonvolatile memory or an external HDD. The interface 216 is connected with the servo control device 313. The servo control device 313 controls the servo motor 30 depending on inputted torque command values so that the torque detection values of the joints 111 to 116 become equal to the torque command values. That is, the CPU 201 outputs instruction data, used for driving the servo motor 30 and indicating the amount of control on the rotation angle of the servo motor 30, to the servo control device 313 at predetermined intervals via the bus 217 and the interface 216.

Depending on the driving instruction sent from the CPU 201, the servo control device 313 calculates the amount of current to be supplied to the servo motor 30, supplies the current to the servo motor 30, and thereby performs joint angle control on the joints 111 to 116 of the robot arm 101. That is, the CPU 201 controls the servo motor 30 via the servo control device 313, and causes the servo motor 30 to drive and control the joints 111 to 116 so that the torque detection values (i.e. output signal from the torque sensor unit) of the joints 111 to 116 become equal to the target torque values. The hand 102 includes a plurality of fingers that can hold a workpiece W, and an actuator (not illustrated) that drives the plurality of fingers. Thus, with the plurality of fingers driven, the hand 102 can hold the workpiece.

The torque sensor unit of the present embodiment is compact, and has high measurement accuracy. Since the robot 500 that includes the torque sensor unit can perform the force control with high accuracy, the robot 500 can perform a high degree of work, such as assembling of a precision device. That is, the robot 500 can suitably perform a method of manufacturing products, such as assembling a workpiece W into a product, by using detection results by the torque sensor unit.

Second Embodiment

Next, with reference to FIGS. 8A and 8B, a torque sensor unit of a second embodiment will be described. In the first embodiment, the outer ring portion 2 and the inner ring portion 3 are not formed like a cylinder having a constant thickness. Instead, each of the outer ring portion 2 and the inner ring portion 3 has a flange portion that projects in a direction orthogonal to the rotation axis 14, and is almost L-shaped in cross section.

The second embodiment is the same as the first embodiment in that each of the outer ring portion 2 and the inner ring portion 3 has a flange portion that projects in a direction orthogonal to the rotation axis 14. However, the second embodiment differs from the first embodiment in shape of the flange portion. In the following description of the second embodiment, the description for features identical to those of the first embodiment will be simplified or omitted.

Figure 8A:
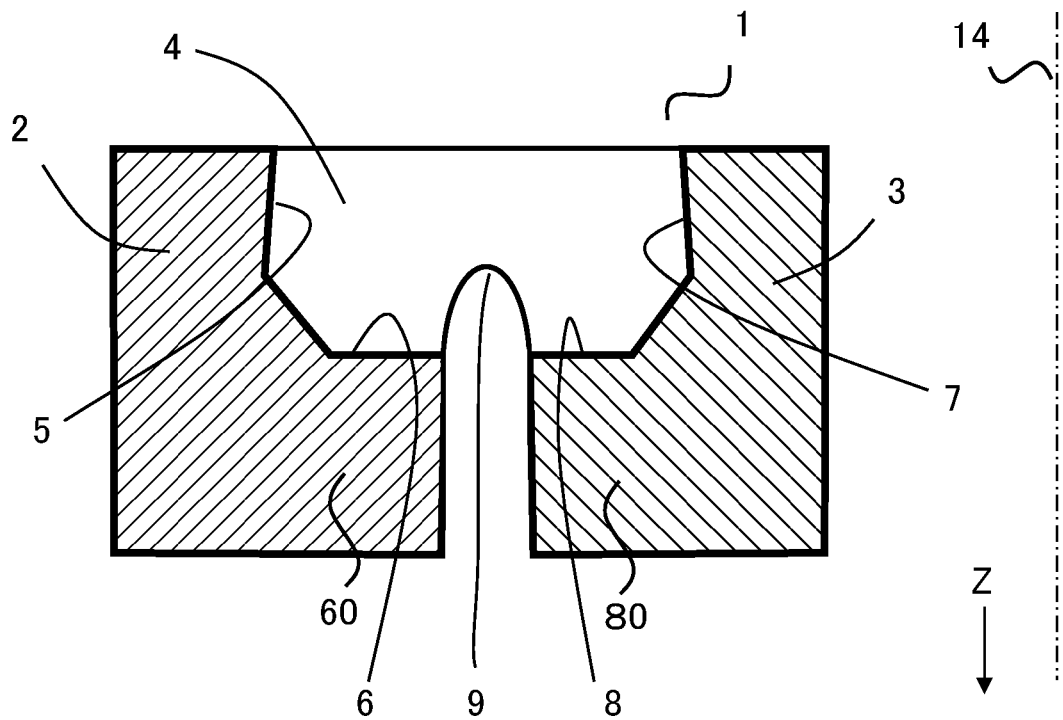
FIG. 8A is a cross-sectional view of a structure of a second embodiment, taken along a line A-A of FIG. 3.
Figure 8B:
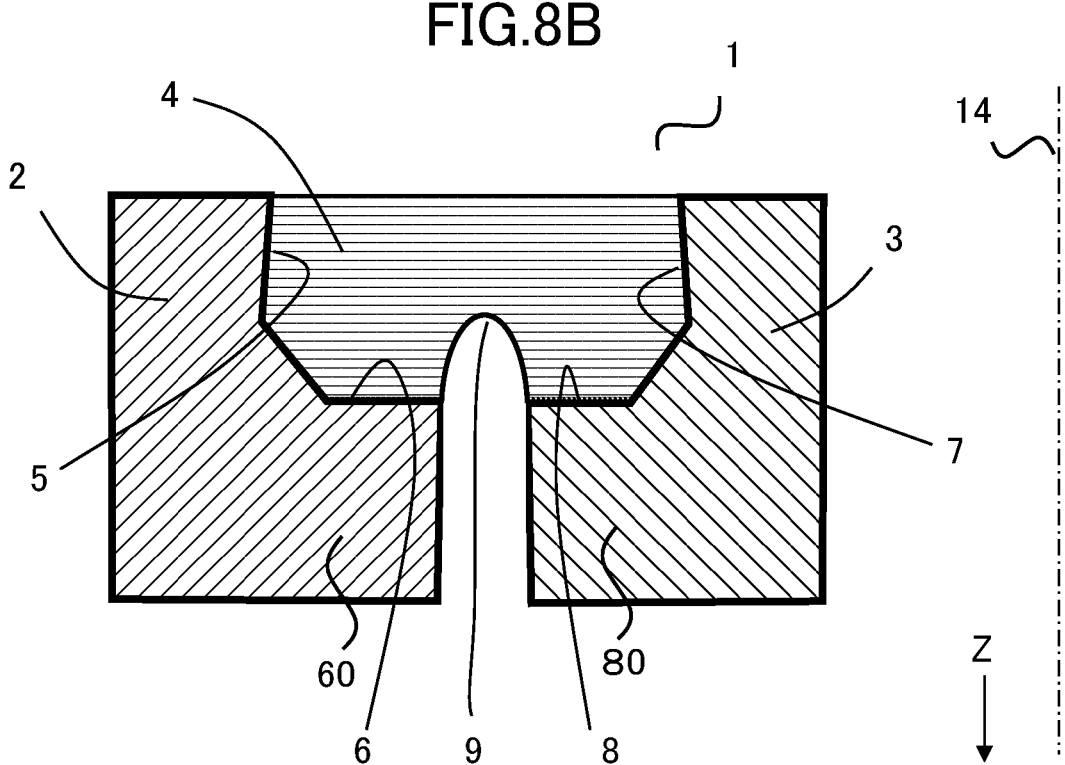
FIG. 8B is a cross-sectional view of the structure of the second embodiment, taken along a line B-B of FIG. 3.

FIGS. 8A and 8B of the second embodiment respectively correspond to FIGS. 4A and 4B of the first embodiment. FIG. 8A is a cross-sectional view of the structure 1, taken along a line A-A of FIG. 3. The line A-A indicates a direction of a radius of the outer ring portion 2, and on the radius, any connecting portion 4 is not formed. FIG. 8B is a cross-sectional view of the structure 1, taken along a line B-B of FIG. 3. The line B-B indicates a direction of a radius of the outer ring portion 2, and on the radius, a connecting portion 4 is formed.

As illustrated in FIG. 8A, the cross section of each of the outer ring portion 2 and the inner ring portion 3 is almost L-shaped. The outer ring portion 2 includes a cylindrical portion (first cylindrical portion), and a flange portion (first convex portion) 60. The flange portion 60 projects from an inner surface 5 of the cylindrical portion toward the rotation axis 14. The inner ring portion 3 includes a cylindrical portion (second cylindrical portion), and a flange portion (second convex portion) 80. The flange portion 80 projects from an outer surface 7 of the cylindrical portion toward a direction opposite to the rotation axis 14. In other words, the flange portion 60 may be a convex portion projecting from the cylindrical portion toward the center of the outer ring portion 2, and the flange portion 80 may be a convex portion projecting from the cylindrical portion toward a direction opposite to the center of the inner ring portion 3.

As illustrated in FIGS. 8A and 8B, the present embodiment differs from the first embodiment in the cross-sectional shape of the outer ring portion 2 and the inner ring portion 3. In the first embodiment, as illustrated in FIGS. 4A and 4B, the cross-sectional shape of each of the outer ring portion 2 and the inner ring portion 3 has six angles, and is a polygon into which two rectangles are combined with each other. In the present embodiment, however, the cross-sectional shape of each of the outer ring portion 2 and the inner ring portion 3 is a polygon that has seven angles. Thus, in the first embodiment, each connecting portion 4 links to two sides of the outer ring portion 2 and two sides of the inner ring portion 3 in FIG. 4B; in the present embodiment, each connecting portion 4 links to three sides of the outer ring portion 2 and three sides of the inner ring portion 3 in FIG. 8B.

Also in the present embodiment, since the outer ring portion 2 and the inner ring portion 3 have the flange portions, the torque sensor of the present embodiment has high mechanical rigidity against the force applied in a direction other than the direction in which the torque Mz is applied around the rotation axis 14. Thus, the deformation and damage hardly occur in the torque sensor of the present embodiment.

In addition, also in the present embodiment, the connecting portions 4 link to the outer ring portion 2 and the inner ring portion 3, not only along a line (side) parallel with the rotation axis, but also along a line (side) whose direction intersects the rotation axis. Thus, the torque sensor of the present embodiment has high link strength against the torque Mz applied around the rotation axis 14 and the force applied in a direction other than the direction in which the torque Mz is applied. Thus, the deformation and damage hardly occur in a boundary between the connecting portions 4 and the outer ring portion 2, and a boundary between the connecting portions 4 and the inner ring portion 3.

If the force (e.g. force Mx illustrated in FIG. 1B and applied around the X axis) other than the torque applied around the rotation axis is applied, the stress may concentrate locally on a portion of each connecting portion 4 that crosses over the clearance. However, the cutout portion 9 can prevent the stress from concentrating on the portion, and thereby can prevent damage of the connecting portion 4.

Thus, the present embodiment can provide a torque sensor that has high detection accuracy and keeps sufficient rigidity in the non-detection direction, even when the thickness of the structure 1 is decreased.

Third Embodiment

Next, with reference to FIGS. 9A and 9B, a torque sensor unit of a third embodiment will be described. In the first embodiment, the outer ring portion 2 and the inner ring portion 3 are not formed like a cylinder having a constant thickness. Instead, each of the outer ring portion 2 and the inner ring portion 3 has a flange portion that projects in a direction orthogonal to the rotation axis 14, and is almost L-shaped in cross section.

The third embodiment is the same as the first embodiment in that each of the outer ring portion 2 and the inner ring portion 3 has a flange portion that projects in a direction orthogonal to the rotation axis 14. However, the third embodiment differs from the first embodiment in shape of the cylindrical portion. In the following description of the third embodiment, the description for features identical to those of the first embodiment will be simplified or omitted.

Figure 9A:
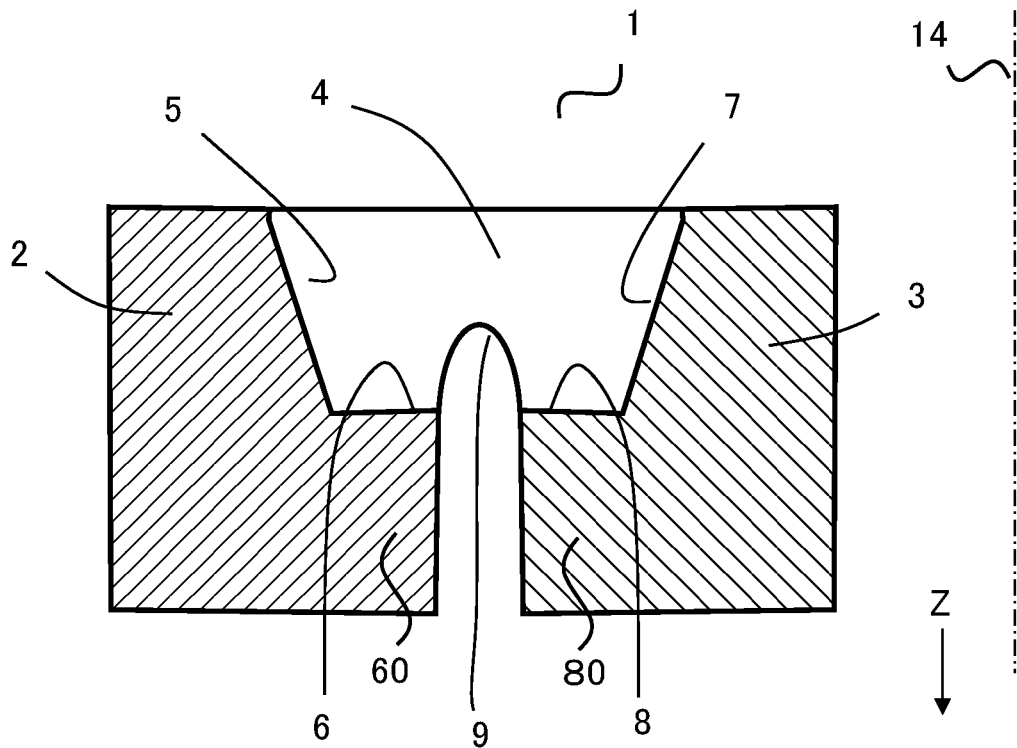
FIG. 9A is a cross-sectional view of a structure of a third embodiment, taken along a line A-A of FIG. 3.
Figure 9B:
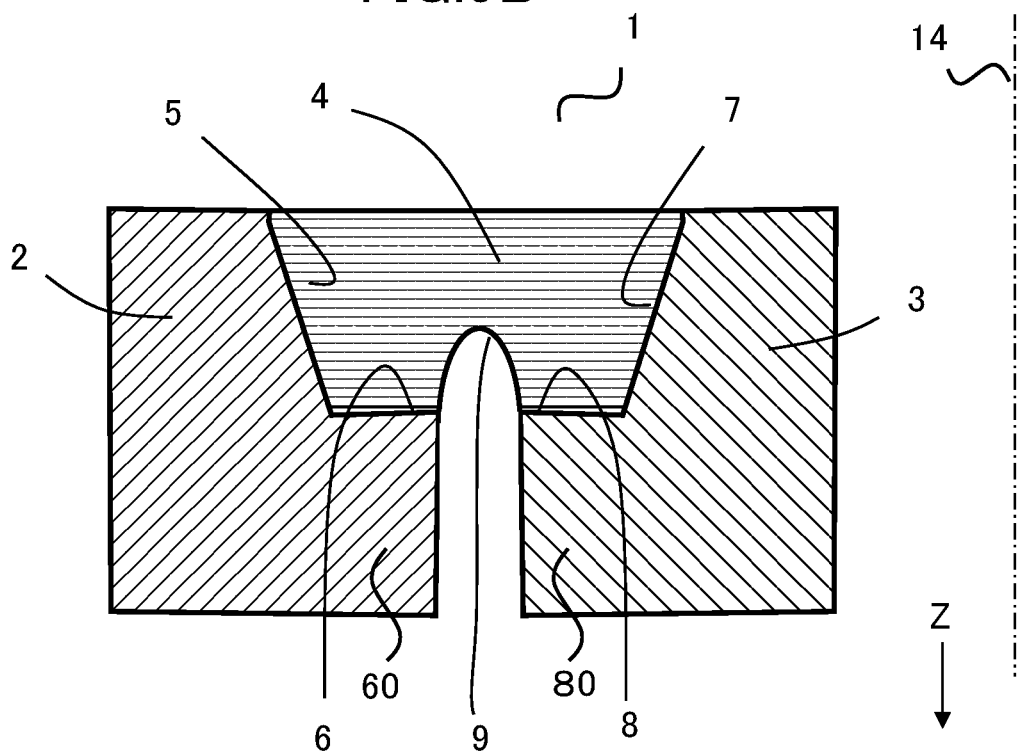
FIG. 9B is a cross-sectional view of the structure of the third embodiment, taken along a line B-B of FIG. 3.

FIGS. 9A and 9B of the third embodiment respectively correspond to FIGS. 4A and 4B of the first embodiment. FIG. 9A is a cross-sectional view of the structure 1, taken along a line A-A of FIG. 3. The line A-A indicates a direction of a radius of the outer ring portion 2, and on the radius, any connecting portion 4 is not formed. FIG. 9B is a cross-sectional view of the structure 1, taken along a line B-B of FIG. 3. The line B-B indicates a direction of a radius of the outer ring portion 2, and on the radius, a connecting portion 4 is formed.

As illustrated in FIG. 9A, the cross section of each of the outer ring portion 2 and the inner ring portion 3 is almost L-shaped. The outer ring portion 2 includes a cylindrical portion (first cylindrical portion), and a flange portion (first convex portion) 60. The flange portion 60 projects from an inner surface 5 of the cylindrical portion toward the rotation axis 14. The inner ring portion 3 includes a cylindrical portion (second cylindrical portion), and a flange portion (second convex portion) 80. The flange portion 80 projects from an outer surface 7 of the cylindrical portion toward a direction opposite to the rotation axis 14. In other words, the flange portion 60 may be a convex portion projecting from the cylindrical portion toward the center of the outer ring portion 2, and the flange portion 80 may be a convex portion projecting from the cylindrical portion toward a direction opposite to the center of the inner ring portion 3.

As illustrated in FIGS. 9A and 9B, the present embodiment differs from the first embodiment in the cross-sectional shape of the outer ring portion 2 and the inner ring portion 3. In the first embodiment, as illustrated in FIGS. 4A and 4B, each of the outer ring portion 2 and the inner ring portion 3 includes the cylindrical portion having a constant thickness and the flange portion projecting from the cylindrical portion.

In the present embodiment, however, the thickness of the cylindrical portion of each of the outer ring portion 2 and the inner ring portion 3 is not constant. Specifically, each of the outer ring portion 2 and the inner ring portion 3 has a slope, and the shape of the slope in a cross-sectional view is a straight line inclined with respect to the rotation axis 14. Thus, in the present embodiment, each connecting portion 4 links to the slope of the outer ring portion 2 and the top surface of the flange portion, and links to the slope of the inner ring portion 3 and the top surface of the flange portion.

Also in the present embodiment, since the outer ring portion 2 and the inner ring portion 3 have the flange portions, the torque sensor of the present embodiment has high mechanical rigidity against the force applied in a direction other than the direction in which the torque Mz is applied around the rotation axis 14. Thus, the deformation and damage hardly occur in the torque sensor of the present embodiment.

In addition, in the present embodiment, the connecting portions 4 link to the outer ring portion 2 and the inner ring portion 3, not along a line (side) parallel with the rotation axis, but along a line (side) whose direction intersects the rotation axis. Thus, the torque sensor of the present embodiment has high link strength against the torque Mz applied around the rotation axis 14 and the force applied in a direction other than the direction in which the torque Mz is applied. Thus, the deformation and damage hardly occur in a boundary between the connecting portions 4 and the outer ring portion 2, and a boundary between the connecting portions 4 and the inner ring portion 3.

If the force (e.g. force Mx illustrated in FIG. 1B and applied around the X axis) other than the torque applied around the rotation axis is applied, the stress may concentrate locally on a portion of each connecting portion 4 that crosses over the clearance. However, also in the present embodiment, the cutout portion 9 can prevent the stress from concentrating on the portion, and thereby can prevent damage of the connecting portion 4.

Thus, the present embodiment can provide a torque sensor that has high detection accuracy and keeps sufficient rigidity in the non-detection direction, even when the thickness of the structure 1 is decreased.

Fourth Embodiment

Next, with reference to FIGS. 10A and 10B, a torque sensor unit of a fourth embodiment will be described. In the first embodiment, the outer ring portion 2 and the inner ring portion 3 are not formed like a cylinder having a constant thickness. Instead, each of the outer ring portion 2 and the inner ring portion 3 has a flange portion that projects in a direction orthogonal to the rotation axis 14, and is almost L-shaped in cross section.

The fourth embodiment is the same as the first embodiment in that each of the outer ring portion 2 and the inner ring portion 3 has a flange portion that projects in a direction orthogonal to the rotation axis 14. However, the fourth embodiment differs from the first embodiment in shape of the cylindrical portion. In the following description of the fourth embodiment, the description for features identical to those of the first embodiment will be simplified or omitted.

Figure 10A:
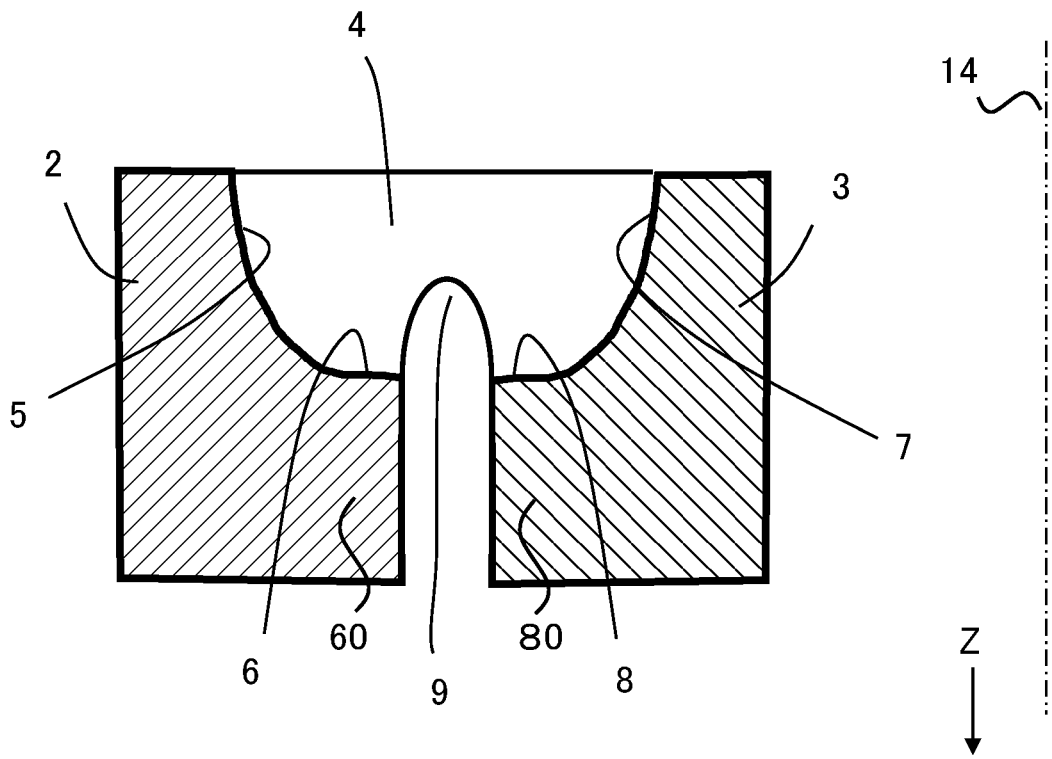
FIG. 10A is a cross-sectional view of a structure of a fourth embodiment, taken along a line A-A of FIG. 3.
Figure 10B:
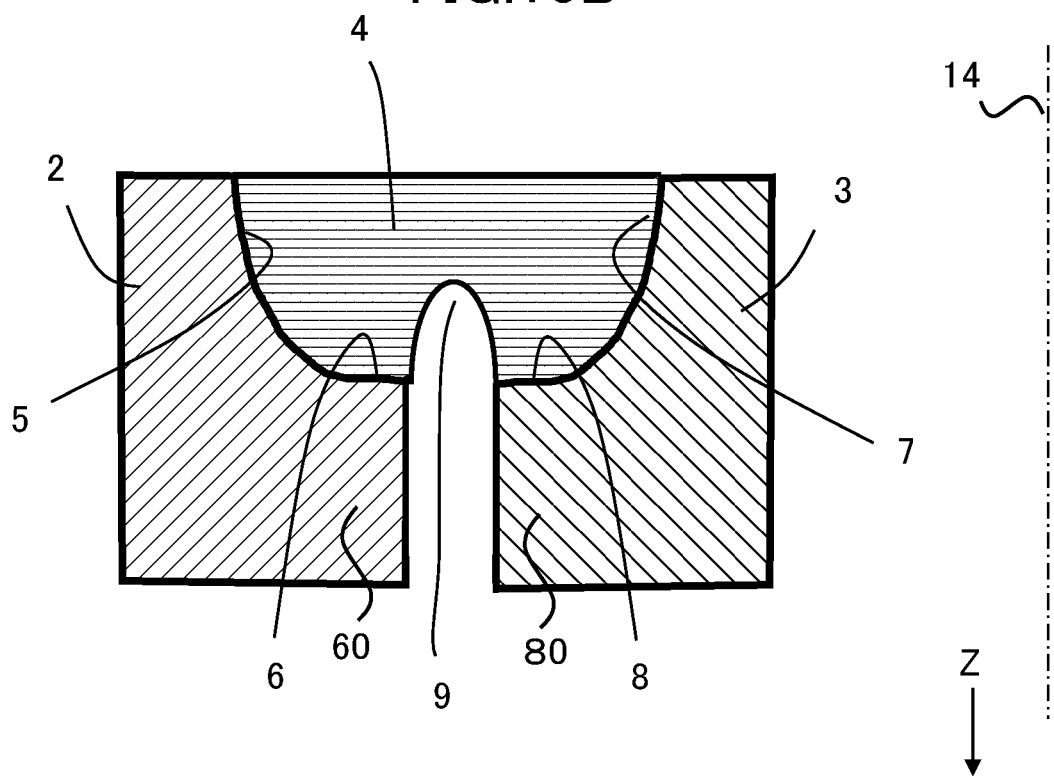
FIG. 10B is a cross-sectional view of the structure of the fourth embodiment, taken along a line B-B of FIG. 3.

FIGS. 10A and 10B of the fourth embodiment respectively correspond to FIGS. 4A and 4B of the first embodiment. FIG. 10A is a cross-sectional view of the structure 1, taken along a line A-A of FIG. 3. The line A-A indicates a direction of a radius of the outer ring portion 2, and on the radius, any connecting portion 4 is not formed. FIG. 10B is a cross-sectional view of the structure 1, taken along a line B-B of FIG. 3. The line B-B indicates a direction of a radius of the outer ring portion 2, and on the radius, a connecting portion 4 is formed.

As illustrated in FIG. 10A, the cross section of each of the outer ring portion 2 and the inner ring portion 3 is almost L-shaped. The outer ring portion 2 includes a cylindrical portion (first cylindrical portion), and a flange portion (first convex portion) 60. The flange portion 60 projects from an inner surface 5 of the cylindrical portion toward the rotation axis 14. The inner ring portion 3 includes a cylindrical portion (second cylindrical portion), and a flange portion (second convex portion) 80. The flange portion 80 projects from an outer surface 7 of the cylindrical portion toward a direction opposite to the rotation axis 14. In other words, the flange portion 60 may be a convex portion projecting from the cylindrical portion toward the center of the outer ring portion 2, and the flange portion 80 may be a convex portion projecting from the cylindrical portion toward a direction opposite to the center of the inner ring portion 3.

As illustrated in FIGS. 10A and 10B, the present embodiment differs from the first embodiment in the cross-sectional shape of the outer ring portion 2 and the inner ring portion 3. In the first embodiment, as illustrated in FIGS. 4A and 4B, each of the outer ring portion 2 and the inner ring portion 3 includes the cylindrical portion having a constant thickness and the flange portion projecting from the cylindrical portion.

In the present embodiment, however, the thickness of the cylindrical portion of each of the outer ring portion 2 and the inner ring portion 3 is not constant. Specifically, each of the outer ring portion 2 and the inner ring portion 3 has a curved slope (curved shape), and the shape of the curved slope in a cross-sectional view is a curved line inclined with respect to the rotation axis 14. Thus, in the present embodiment, each connecting portion 4 links to the curved slope of the outer ring portion 2 and the top surface of the flange portion, and links to the curved slope of the inner ring portion 3 and the top surface of the flange portion.

Also in the present embodiment, since the outer ring portion 2 and the inner ring portion 3 have the flange portions, the torque sensor of the present embodiment has high mechanical rigidity against the force applied in a direction other than the direction in which the torque Mz is applied around the rotation axis 14. Thus, the deformation and damage hardly occur in the torque sensor of the present embodiment.

In addition, in the present embodiment, the connecting portions 4 link to the outer ring portion 2 and the inner ring portion 3, not along a line (side) parallel with the rotation axis, but along a curved line (side) whose direction intersects the rotation axis. Thus, the torque sensor of the present embodiment has high link strength against the torque Mz applied around the rotation axis 14 and the force applied in a direction other than the direction in which the torque Mz is applied. Thus, the deformation and damage hardly occur in a boundary between the connecting portions 4 and the outer ring portion 2, and a boundary between the connecting portions 4 and the inner ring portion 3.

If the force (e.g. force Mx illustrated in FIG. 1B and applied around the X axis) other than the torque applied around the rotation axis is applied, the stress may concentrate locally on a portion of each connecting portion 4 that crosses over the clearance. However, also in the present embodiment, the cutout portion 9 can prevent the stress from concentrating on the portion, and thereby can prevent damage of the connecting portion 4.

Thus, the present embodiment can provide a torque sensor that has high detection accuracy and keeps sufficient rigidity in the non-detection direction, even when the thickness of the structure 1 is decreased.

Fifth Embodiment

Next, with reference to FIGS. 11A and 11B, a torque sensor unit of a fifth embodiment will be described. In the first embodiment, the outer ring portion 2 and the inner ring portion 3 are not formed like a cylinder having a constant thickness. Instead, each of the outer ring portion 2 and the inner ring portion 3 has a flange portion that projects in a direction orthogonal to the rotation axis 14, and is almost L-shaped in cross section.

The fifth embodiment is the same as the first embodiment in that each of the outer ring portion 2 and the inner ring portion 3 has a flange portion that projects in a direction orthogonal to the rotation axis 14. However, the fifth embodiment differs from the first embodiment in position of the flange portion and in cross-sectional shape of the outer ring portion 2 and the inner ring portion 3. In the present embodiment, the cross-sectional shape of the outer ring portion 2 and the inner ring portion 3 is not an L shape, but a shape into which a T shape is rotated by 90 degrees. In addition, the structure 1 includes two connecting portions 4A and 4B. The connecting portions 4A and 4B are arranged adjacent to each other in a direction (Z direction) in which the rotation axis 14 extends.

In the following description of the fifth embodiment, the description for features identical to those of the first embodiment will be simplified or omitted.

Figure 11A:
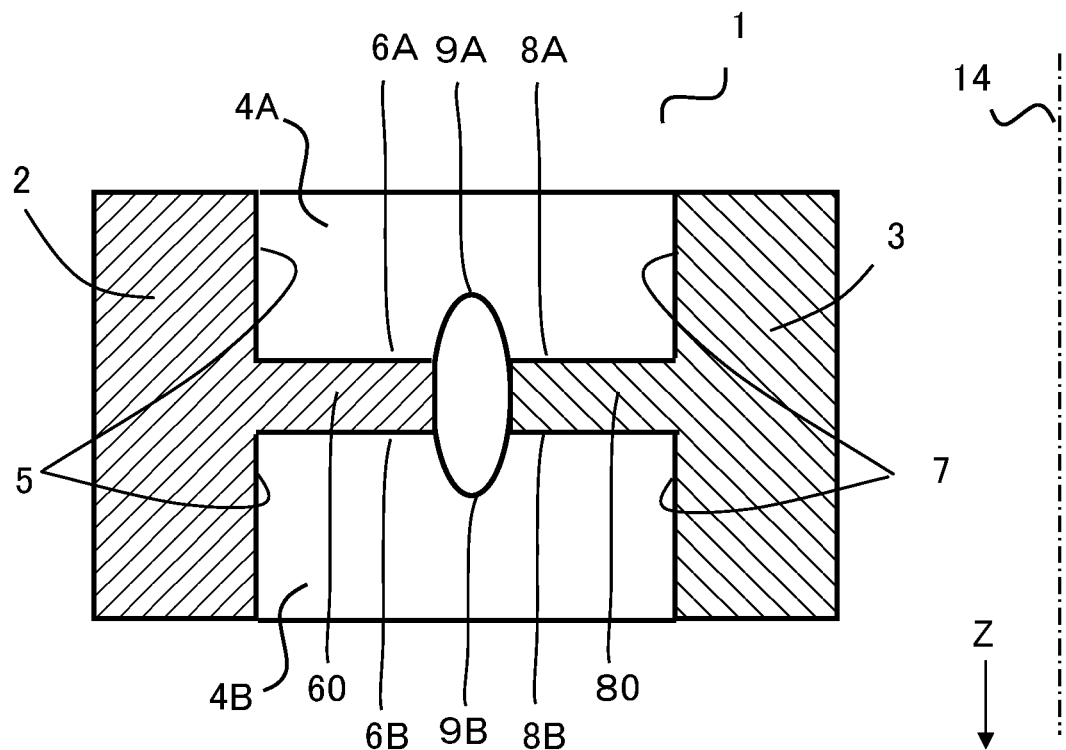
FIG. 11A is a cross-sectional view of a structure of a fifth embodiment, taken along a line A-A of FIG. 3.
Figure 11B:
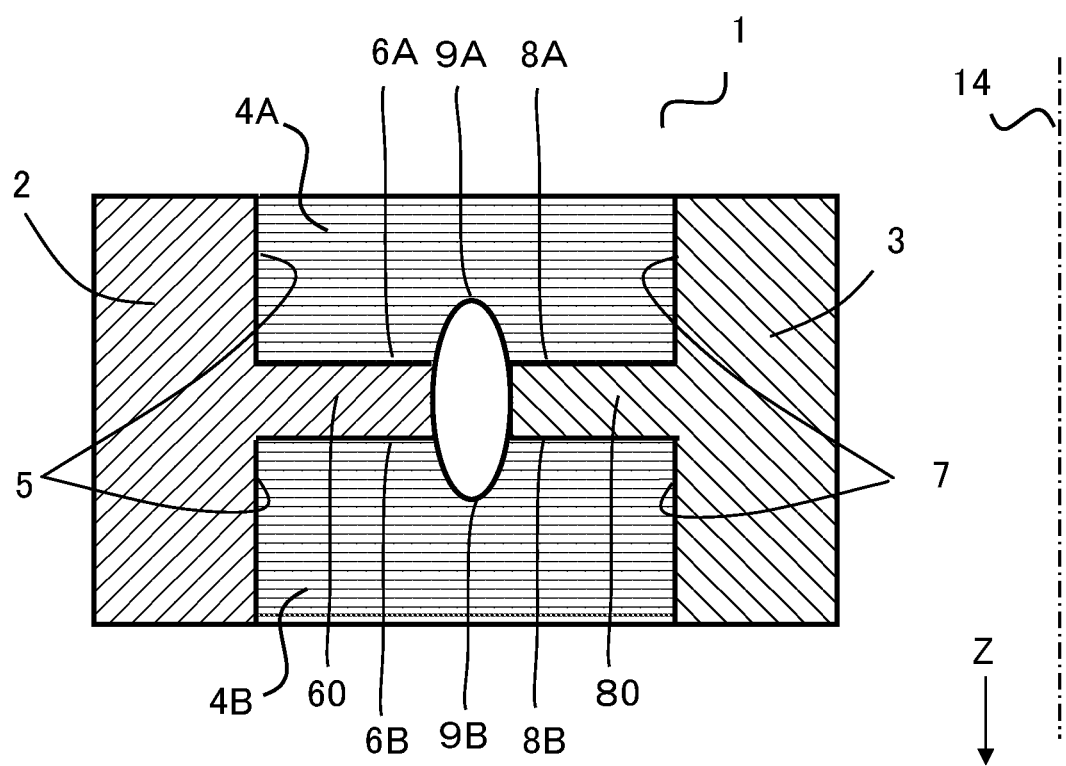
FIG. 11B is a cross-sectional view of the structure of the fifth embodiment, taken along a line B-B of FIG. 3.

FIGS. 11A and 11B of the fifth embodiment respectively correspond to FIGS. 4A and 4B of the first embodiment. FIG. 11A is a cross-sectional view of the structure 1, taken along a line A-A of FIG. 3. The line A-A indicates a direction of a radius of the outer ring portion 2, and on the radius, any connecting portion 4 is not formed. FIG. 11B is a cross-sectional view of the structure 1, taken along a line B-B of FIG. 3. The line B-B indicates a direction of a radius of the outer ring portion 2, and on the radius, a connecting portion 4 is formed.

In the present embodiment, as illustrated in FIGS. 11A and 11B, each of the outer ring portion 2 and the inner ring portion 3 has a cross-sectional shape into which a T shape is rotated by 90 degrees.

The outer ring portion 2 includes a cylindrical portion (first cylindrical portion), and a flange portion (first convex portion) 60 that projects from an inner surface 5 of the cylindrical portion toward the rotation axis 14. When viewed along the rotation axis 14 (Z direction), the flange portion 60 projects from not an end portion of the cylindrical portion, but a portion of the cylindrical portion between both ends of the cylindrical portion. The inner ring portion 3 includes a cylindrical portion (second cylindrical portion), and a flange portion (second convex portion) 80 that projects from an outer surface 7 of the cylindrical portion toward a direction opposite to the rotation axis 14. When viewed along the rotation axis 14 (Z direction), the flange portion 80 projects from not an end portion of the cylindrical portion, but a portion of the cylindrical portion between both ends of the cylindrical portion. In other words, the flange portion 60 may be a convex portion projecting from the cylindrical portion toward the center of the outer ring portion 2, and the flange portion 80 may be a convex portion projecting from the cylindrical portion toward a direction opposite to the center of the inner ring portion 3.

The connecting portions 4A and 4B are formed such that the flange portions 60 and 80 are sandwiched between the connecting portions 4A and 4B when viewed along the rotation-axis direction (Z direction). The connecting portion 4A has a cutout portion 9A, and the connecting portion 4B has a cutout portion 9B. The connecting portion 4A links to the outer ring portion 2 such that the connecting portion 4A links to the inner surface 5 of the cylindrical portion and a top surface 6A of the flange portion 60, and links to the inner ring portion 3 such that the connecting portion 4A links to the outer surface 7 of the cylindrical portion and a top surface 8A of the flange portion 80. The connecting portion 4B links to the outer ring portion 2 such that the connecting portion 4B links to the inner surface 5 of the cylindrical portion and a bottom surface 6B of the flange portion 60, and links to the inner ring portion 3 such that the connecting portion 4B links to the outer surface 7 of the cylindrical portion and a bottom surface 8B of the flange portion 80.

Also in the present embodiment, since the outer ring portion 2 and the inner ring portion 3 have the flange portions, the torque sensor of the present embodiment has high mechanical rigidity against the force applied in a direction other than the direction in which the torque Mz is applied around the rotation axis 14. Thus, the deformation and damage hardly occur in the torque sensor of the present embodiment.

In addition, also in the present embodiment, the connecting portions 4 link to the outer ring portion 2 and the inner ring portion 3, not only along a line (side) parallel with the rotation axis, but also along a line (side) orthogonal to the rotation axis. Thus, the torque sensor of the present embodiment has high link strength against the torque Mz applied around the rotation axis 14 and the force applied in a direction other than the direction in which the torque Mz is applied. Thus, the deformation and damage hardly occur in a boundary between the connecting portions 4 and the outer ring portion 2, and a boundary between the connecting portions 4 and the inner ring portion 3.

If the force (e.g. force Mx illustrated in FIG. 1B and applied around the X axis) other than the torque applied around the rotation axis is applied, the stress may concentrate locally on a portion of each of the connecting portions 4A and 4B that crosses over the clearance. However, also in the present embodiment, the cutout portions 9A and 9B can prevent the stress from concentrating on the portion, and thereby can prevent damage of the connecting portions 4A and 4B.

Thus, the present embodiment can provide a torque sensor that has high detection accuracy and keeps sufficient rigidity in the non-detection direction, even when the thickness of the structure 1 is decreased.

The present invention is not limited to the above-described embodiments and example, and may be variously modified within the technical concept of the present invention.

For example, although the cross-sectional shape of the outer ring portion 2 and the inner ring portion 3 of the second embodiment is a septangle, the cross-sectional shape may be another polygon. In addition, in the fourth embodiment, the side surface of each of the outer ring portion 2 and the inner ring portion 3 in a cross-sectional view may not be the curve illustrated in FIGS. 10A and 10B, and may be any one of various curved shapes, such as a quadratic curve, an arc, or one portion of an ellipse. In addition, the side surface of each of the outer ring portion 2 and the inner ring portion 3 in a cross-sectional view may be a line in which a straight line and a curve lined are combined with each other.

In addition, components of different embodiments may be combined with each other. For example, the outer ring portion of the first embodiment may be combined with the inner ring portion of the second embodiment. In addition, the shape of the outer ring portion and the inner ring portion may be not only a circular shape but also a rectangular or triangle shape, if necessary.

In addition, the flange portion may not be the convex-shape portion that projects in a direction orthogonal to the rotation axis. For example, the flange portion may be a convex-shape portion that projects in a direction that crosses the rotation axis at angles other than right angles.

In addition, although an optical encoder excels in accuracy as the detection unit that detects the displacement between the outer ring portion and the inner ring portion, another type of displacement detection unit, such as a magnetic encoder, may be used.

Typically, the torque sensor unit of the embodiments is attached to a robot for measuring the torque of the robot. However, the torque sensor unit may be attached to another device. In addition, the robot may not be the robot illustrated in FIG. 5 and having a six-axis control robot arm, and may be another type of robot. Under the control of motion performed by using detection results by the torque sensor unit, the robot can perform various types of work, which are achieved by a method of manufacturing products and which include assembling, machining, and conveying a workpiece.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-1012, filed Jan. 7, 2020, which is hereby incorporated by reference herein in its entirety.

What is claimed is:

1. A torque detection device comprising:
   a first portion;
   a second portion disposed inside the first portion; and
   a connecting portion configured to link the first portion and the second portion,
   wherein the first portion comprises a first surface facing the second portion and a first convex portion that projects toward the second portion, the first convex portion having a second surface connected to the first surface,
   wherein the second portion comprises a third surface facing the first portion and a second convex portion that projects toward the first portion, the second convex portion having a fourth surface connected to the third surface,
   wherein the connecting portion is configured to link to the first surface, the second surface, the third surface, and the fourth surface, and
   wherein in a case where torque is applied, the connecting portion deforms, and the first portion and the second portion are displaced relative to each other.

2. The torque detection device according to claim 1,
   wherein the first portion comprises a first cylindrical portion,
   wherein the second portion comprises a second cylindrical portion,
   wherein the first surface is an inner surface of the first cylindrical portion, and
   wherein the third surface is an outer surface of the second cylindrical portion.

3. The torque detection device according to claim 2, wherein the first cylindrical portion and/or the second cylindrical portion has a cylindrical shape having a predetermined thickness.

4. The torque detection device according to claim 2, wherein the first surface and/or the second surface have/has a curved surface shape.

5. The torque detection device according to claim 1, wherein the connecting portion is configured to cross over a clearance between the first convex portion and the second convex portion and link the first portion and the second portion.

6. The torque detection device according to claim 1, wherein the connecting portion comprises a cutout portion formed in a portion that crosses over a clearance between the first convex portion and the second convex portion.

7. The torque detection device according to claim 6, wherein the cutout portion has a curved shape.

8. The torque detection device according to claim 1, further comprising an encoder configured to detect a relative displacement between the first portion and the second portion.

9. The torque detection device according to claim 1, wherein the first portion is an outer ring portion and the second portion is an inner ring portion.

10. A robot comprising the torque detection device according to claim 1.

11. A method that causes the robot according to claim 10 to manufacture a product by using a detection result by the torque detection device.

12. A control device configured to use an output signal from the torque detection device according to claim 1 and control motion of a device in which the torque detection device is mounted.

13. A torque detection method using the torque detection device according to claim 1,
    the torque detection method comprising:
    detecting the torque, depending on a relative displacement between the first portion and the second portion.

14. A computer-readable non-transitory recording medium storing a control program configured to perform the torque detection method according to claim 13.

15. The torque detection device according to claim 1, wherein the first surface and the second surface are connected so as to form almost L-shaped plane, and the third surface and the fourth surface are connected so as to form almost L-shaped plane.

16. The torque detection device according to claim 15, wherein the first portion and the second portion include at least two L-shaped portions respectively, and the connecting portion is configured to link to the at least two L-shaped portions.

17. The torque detection device according to claim 1, wherein the second surface is connected to the first surface so that the angle between the first surface and the second surface is approximately 90 degrees, and the fourth surface is connected to the third surface so that the angle between the third surface and the fourth surface is approximately 90 degrees.

18. The torque detection device according to claim 1, wherein the second surface is connected to the first surface so that the angle between the first surface and the second surface is greater than 90 degrees, and the fourth surface is connected to the third surface so that the angle between the third surface and the fourth surface is greater than 90 degrees.

19. The torque detection device according to claim 1, wherein the first surface and the second surface are connected via a fifth surface having a different angle from the first surface and the second surface, and the third surface and the fourth surface are connected via a sixth surface having a different angle from the third surface and the fourth surface.

20. The torque detection device according to claim 1, wherein the first surface and the second surface are connected via a first curved surface, and the third surface and the fourth surface are connected via a second curved surface.

21. A structure comprising:
   a first portion;
   a second portion disposed inside the first portion; and
   a connecting portion configured to link the first portion and the second portion,
   wherein the first portion comprises a first surface facing the second portion and a first convex portion that projects toward the second portion, the first convex portion having a second surface connected to the first surface,
   wherein the second portion comprises a third surface facing the first portion and a second convex portion that projects toward the first portion, the second convex portion having a fourth surface connected to the third surface,
   wherein the connecting portion is configured to link to the first surface, the second surface, the third surface, and the fourth surface, and
   wherein in a case where torque is applied, the connecting portion deforms, and the first portion and the second portion are displaced relative to each other.

* * * * *